(12) United States Patent
Hisa et al.

(10) Patent No.: US 8,482,590 B2
(45) Date of Patent: Jul. 9, 2013

(54) OPTICAL SCANNING DEVICE AND IMAGE FORMING APPARATUS

(75) Inventors: Fumiya Hisa, Kanagawa (JP); Toshiharu Orui, Kanagawa (JP); Tomoaki Sakita, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 47 days.

(21) Appl. No.: 13/178,210

(22) Filed: Jul. 7, 2011

(65) Prior Publication Data
US 2012/0105569 A1 May 3, 2012

(30) Foreign Application Priority Data
Nov. 2, 2010 (JP) ................................. 2010-246455

(51) Int. Cl.
*B41J 15/14* (2006.01)
*B41J 27/00* (2006.01)

(52) U.S. Cl.
USPC .......................................... 347/242; 347/257

(58) Field of Classification Search
USPC ........................ 347/231, 241–245, 256–261
See application file for complete search history.

(56) References Cited

U.S. PATENT DOCUMENTS
4,918,306 A * 4/1990 Saito ............................. 250/235

FOREIGN PATENT DOCUMENTS
| JP | 06-067104 A | | 3/1994 |
| JP | 06-067105 A | | 3/1994 |
| JP | 09-080336 A | | 3/1997 |
| JP | 2003-270578 A | | 9/2003 |
| JP | 2007072069 A | * | 3/2007 |
| JP | 2009-080336 A | | 4/2009 |

* cited by examiner

*Primary Examiner* — Hai C Pham
(74) *Attorney, Agent, or Firm* — Sughrue Mion, PLLC

(57) ABSTRACT

An optical scanning device includes a housing, a light source, a rotatable polygon mirror deflecting a light beam from the light source, a scanning optical system scanning a scanning object with the light beam from the polygon mirror, first and second reflective mirrors one of which is provided inside a deflection area, and a photodetector detecting the timing of scanning of the scanning object with the light beam from the one of the first and second reflective mirrors. The scanning object is one of first and second scanning objects. The housing includes first and second supports configured to support the first and second reflective mirrors at first and second positions, respectively, that are outside first and second scan-use areas, respectively. The first position is also inside the second scan-use area. The first and second scan-use areas are used for the scanning of the first and second scanning objects, respectively.

18 Claims, 11 Drawing Sheets

OPTICAL SCANNING DEVICE AND IMAGE FORMING APPARATUS

CROSS-REFERENCE TO RELATED APPLICATIONS

This application is based on and claims priority under 35 USC 119 from Japanese Patent Application No. 2010-246455 filed Nov. 2, 2010.

BACKGROUND (i) Technical Field

The present invention relates to an optical scanning device and an image forming apparatus.

(ii) Related Art

Typical image forming apparatuses include an apparatus employing an exposure device that forms an electrostatic latent image by scanning an image bearing member with light. Such an exposure device is an assembly including a light source that emits light, plural optical members, and so forth. From the viewpoints of costs and reliability improvement, one type of exposure device may be applied to different types of image forming apparatuses.

SUMMARY

According to an aspect of the invention, there is provided an optical scanning device including a housing, a light source that emits a light beam, a rotatable polygon mirror that receives the light beam from the light source while rotating and deflects the light beam by reflecting the light beam in a direction corresponding to an angle of rotation thereof, a scanning optical system that guides the light beam from the rotatable polygon mirror to a scanning object in such a manner as to repeatedly scan the scanning object with the light beam, first and second reflective mirrors one of which is provided inside a deflection area within which the light beam is deflected by the rotatable polygon mirror, and a photodetector that receives the light beam reflected by the one of the first and second reflective mirrors and detects the timing of scanning of the scanning object with the light beam. The scanning object is one of first and second scanning objects. The housing includes a first support configured to support the first reflective mirror at a first position that is outside a first scan-use area and inside a second scan-use area, the first scan-use area being used for the scanning of the first scanning object and being narrower than the second scan-use area that is used for the scanning of the second scanning object, the first reflective mirror being supported in such a manner as to reflect the light beam toward the photodetector; and a second support configured to support the second reflective mirror at a second position that is outside the second scan-use area, the second reflective mirror being supported in such a manner as to reflect the light beam toward the photodetector.

BRIEF DESCRIPTION OF THE DRAWINGS

Exemplary embodiments of the present invention will be described in detail based on the following figures, wherein.

DETAILED DESCRIPTION

Exemplary embodiments of the present invention will now be described.

Figure 1:
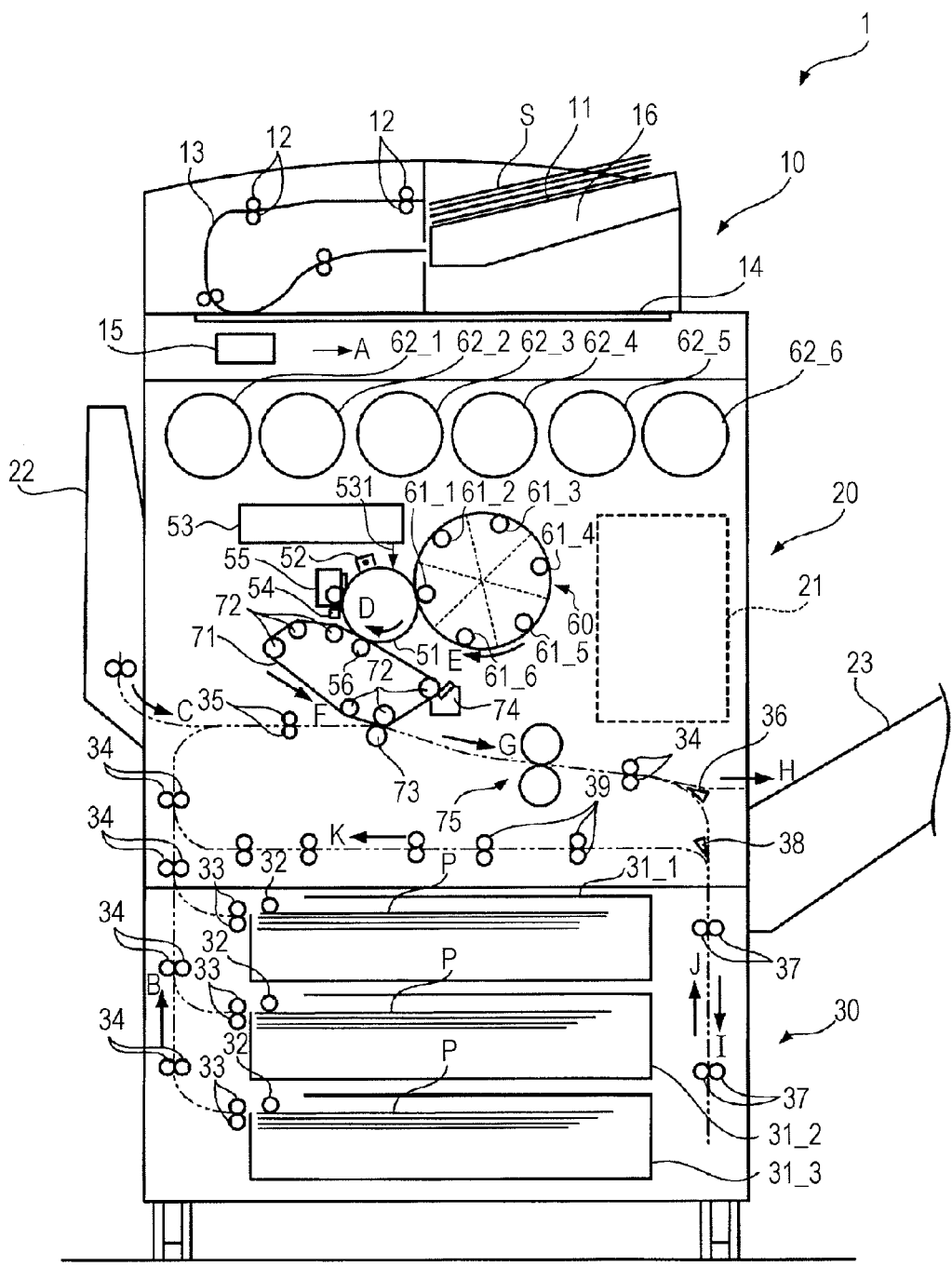
FIG. 1 schematically illustrates an image forming apparatus according to a first exemplary embodiment of the invention.

FIG. 1 schematically illustrates an image forming apparatus 1 according to a first exemplary embodiment of the invention. The image forming apparatus 1 includes an exposure device 53. The exposure device 53 corresponds to an exemplary embodiment of the optical scanning device according to the invention.

The image forming apparatus 1 includes a document reading section 10, an image forming section 20, and a paper containing section 30.

The document reading section 10 includes a document feeding tray 11 on which document sheets S are stacked. The document sheets S on the document feeding tray 11 are fed out one by one. Each of the fed document sheets S is transported along a transport path 13 by transport rollers 12. A document-reading optical system 15 is provided under a document reading plate 14 made of transparent glass and reads characters and images recorded on the document sheet S. Subsequently, the document sheet S is output onto a document output tray 16.

The document reading section 10 includes a hinge extending laterally at the back thereof. The document feeding tray 11 and the document output tray 16 are rotatably movable upward together about the hinge. When the document feeding tray 11 and the document output tray 16 are moved upward, the document reading plate 14 appears. In the document reading section 10, instead of placing document sheets S on the document feeding tray 11, one document sheet S may be placed face down on the document reading plate 14. In this state, when the document-reading optical system 15 is moved in the direction of arrow A, characters and images recorded on the document sheet S on the document reading plate 14 are read.

An image signal is generated by the document-reading optical system 15 and is input to a processing/controlling circuit 21. The processing/controlling circuit 21 forms an image on the basis of the image signal in a manner described separately below. The processing/controlling circuit 21 controls the operations of various elements included in the image forming apparatus 1.

The paper containing section 30 is provided at the bottom of the image forming apparatus 1 and includes three paper feeding trays 31_1 to 31_3. The paper feeding trays 31_1 to 31_3 contain pieces of paper P of, for example, respectively different sizes that are stacked therein. The paper feeding trays 31_1 to 31_3 are drawable outward for refilling of paper P.

Some pieces of paper P are picked up from one of the three paper feeding trays 31_1 to 31_3 (herein, the paper feeding tray 31_3 is taken as an example) that contains pieces of paper P matching, for example, the size of the document sheet S by a corresponding one of pickup rollers 32. The pieces of paper P are separated one by one by separating rollers 33. Each of the separated pieces of paper P is transported upward in the direction of arrow B by transport rollers 34, and is further transported by standby rollers 35 with a timing adjusted by the standby rollers 35. The subsequent process of transportation from the standby rollers 35 will be described separately below.

The image forming section 20 includes a manual feeding tray 22. The manual feeding tray 22 is of foldable type and is openable about the lower end thereof. By opening the manual feeding tray 22 and placing pieces of paper P thereon, each of the pieces of paper P on the manual feeding tray 22 is feedable in the direction of arrow C.

The image forming section 20 also includes in a middle portion thereof a photoconductor 51 configured to rotate in the direction of arrow D. A charging device 52, a developing device 60, a static eliminating device 54, and a cleaner 55 are provided around the photoconductor 51. The exposure device 53 is positioned above the photoconductor 51. Furthermore, a transfer device 56 is provided such that an intermediate transfer belt 71, described separately below, is held between the photoconductor 51 and the transfer device 56.

The photoconductor 51 is a roller. The photoconductor 51 bears an electrical charge by being charged, and releases the electrical charge by being subjected to exposure. Thus, an electrostatic latent image is formed on the surface of the photoconductor 51.

The charging device 52 charges the surface of the photoconductor 51 to a specific potential.

The exposure device 53 receives the image signal from the processing/controlling circuit 21 and outputs a light beam 531 modulated in accordance with the image signal. The charging device 52 charges a portion of the surface of the photoconductor 51 rotating in the direction of arrow D. The charged portion of the photoconductor 51 is repeatedly scanned with the light beam 531 along the rotational axis of the photoconductor 51 (in a direction perpendicular to the page surface of FIG. 1). Thus, an electrostatic latent image is formed on the surface of the photoconductor 51. The electrostatic latent image formed on the surface of the photoconductor 51 by the scanning with the light beam 531 is developed by the developing device 60. Thus, a toner image is formed on the surface of the photoconductor 51. Specifically, the developing device 60 includes six developing units 61_1 to 61_6. The developing device 60 is configured to rotate in the direction of arrow E such that one of the six developing units 61_1 to 61_6 (in FIG. 1, the developing unit 61_1) faces the photoconductor 51. The electrostatic latent image formed on the photoconductor 51 is developed by the developing unit (herein, the developing unit 61_1) facing the photoconductor 51. Thus, the toner image is formed.

The six developing units 61_1 to 61_6 included in the developing device 60 contain toners having respective colors of yellow (Y), magenta (M), cyan (C), black (K), and two special colors selected in accordance with the use by the user. In developing the electrostatic latent image on the photoconductor 51, one of the developing units 61_1 to 61_6 containing a toner having a color to be used at that time is brought to the position facing the photoconductor 51, and development is performed by the developing unit facing the photoconductor 51 with the toner contained therein. Examples of the special colors selected in accordance with the use by the user include a transparent toner for glossy finish of the image and a toner having an adjusted color frequently used by the user.

Six toner tanks 62_1 to 62_6 containing toners having the same colors as those of the respective toners used by the six developing units 61_1 to 61_6 are provided above the developing device 60. When the amounts of any toners in the developing units 61_1 to 61_6 are reduced, the toners in corresponding ones of the toner tanks 62_1 to 62_6 are supplied to corresponding ones of the developing units 61_1 to 61_6.

The toner image developed on the photoconductor 51 by the developing device 60 is transferred to the intermediate transfer belt 71 through an operation of the transfer device 56.

After the transfer, the electrical charge on the photoconductor 51 is eliminated by the static eliminating device 54, and toners remaining on the photoconductor 51 after the transfer are removed by the cleaner 55.

The intermediate transfer belt 71 is an endless belt stretched around plural rollers 72 and rotates in the direction of arrow F. A transfer device 73 is provided near the intermediate transfer belt 71 with a transport path for the paper P defined therebetween. A cleaner 74 configured to remove toners remaining on the intermediate transfer belt 71 after the transfer by the transfer device 73 is provided on the downstream side with respect to the transfer device 73 in the direction of rotation of the intermediate transfer belt 71. The transfer device 73 and the cleaner 74 are movable to and away from the intermediate transfer belt 71.

In forming a multi-color image, while the transfer device 73 and the cleaner 74 are held away from the intermediate transfer belt 71, a process of forming a toner image on the photoconductor 51 with a toner having a specific color and transferring the toner image to the intermediate transfer belt 71 is repeated for the number of relevant developing units (the number of relevant toner colors) by rotating the developing device 60. Thus, plural toner images in different colors are sequentially superposed on the intermediate transfer belt 71.

Subsequently, the transfer device 73 is brought into contact with the intermediate transfer belt 71, and a piece of paper P is fed out by the standby rollers 35 such that the piece of paper P reaches a transfer position, where the transfer device 73 is provided, when the set of superposed toner images in different colors reaches the transfer position. Thus, the set of toner images in different colors on the intermediate transfer belt 71 is transferred to the piece of paper P at the transfer position through an operation of the transfer device 73. The piece of paper P having the set of toner images transferred thereon is further transported in the direction of arrow G and is subjected to heat and pressure applied by a fixing device 75. Thus, an image as a set of fixed toner images is obtained on the piece of paper P. The piece of paper P that has passed through the fixing device 75 is further transported in the direction of arrow H and is output onto a paper output tray 23.

Furthermore, the cleaner 74 is brought into contact with the intermediate transfer belt 71, and toners remaining on the intermediate transfer belt 71 after the transfer by the transfer device 73 are removed from the intermediate transfer belt 71 by the cleaner 74.

The image forming apparatus 1 is capable of forming images on both sides of each piece of paper P. In forming images on both sides of a piece of paper P, the piece of paper P having an image on a first side thereof as described above is not output onto the paper output tray 23. Instead, a guiding member 36 is turned, and the piece of paper P is thus transported in the direction of arrow I by transport rollers 37. Subsequently, the direction of transportation is reversed, and the piece of paper P is guided by another guiding member 38 in such a manner as to be transported in the direction of arrow K by transport rollers 39 and reaches the standby rollers 35.

Subsequently, as in the case described above, another image is formed on a second side of the piece of paper P. The piece of paper P thus having the images on both sides thereof is output onto the paper output tray 23.

Figure 2:
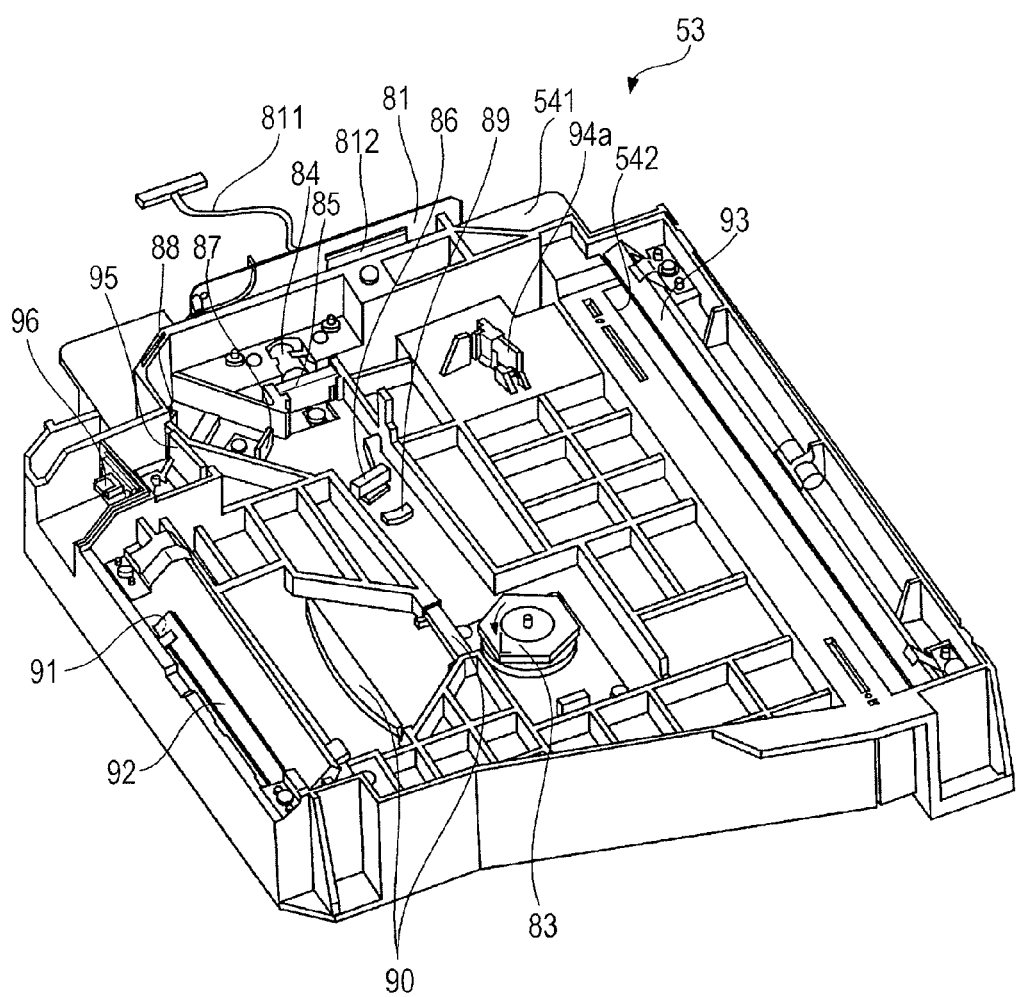
FIG. 2 is a perspective view of an exposure device.

FIG. 2 is a perspective view of the exposure device 53.

FIG. 2 illustrates the inside of the exposure device 53 with a cover thereof removed.

The exposure device 53 includes a housing 541. A circuit board 81 is fixed to the housing 541. As an exemplary light source, a surface-emitting laser diode 82 (see FIGS. 3 and 4) is mounted on the circuit board 81, and a cable 811 is connected to the circuit board 81. A processing circuit 812 is also mounted on the circuit board 81. The laser diode 82 mounted on the circuit board 81 emits plural light beams 531. Hence, the exposure device 53 is configured to scan the photoconductor 51 illustrated in FIG. 1 with the plural light beams 531 at a time.

The cable 811 is also connected to the processing/controlling circuit 21 illustrated in FIG. 1 and transmits the image signal from the processing/controlling circuit 21 to the circuit board 81. The image signal transmitted to the circuit board 81 is processed by the processing circuit 812 and is converted into a modulation signal that controls the modulation of the light beams 531 to be emitted from the laser diode 82, and the modulation signal is transmitted to the laser diode 82. Thus, the laser diode 82 emits plural light beams 531 modulated in accordance with the modulation signal thus transmitted.

The housing 541 of the exposure device 53 houses an optical system including a rotatable polygon mirror 83 and other optical members.

Figure 3:
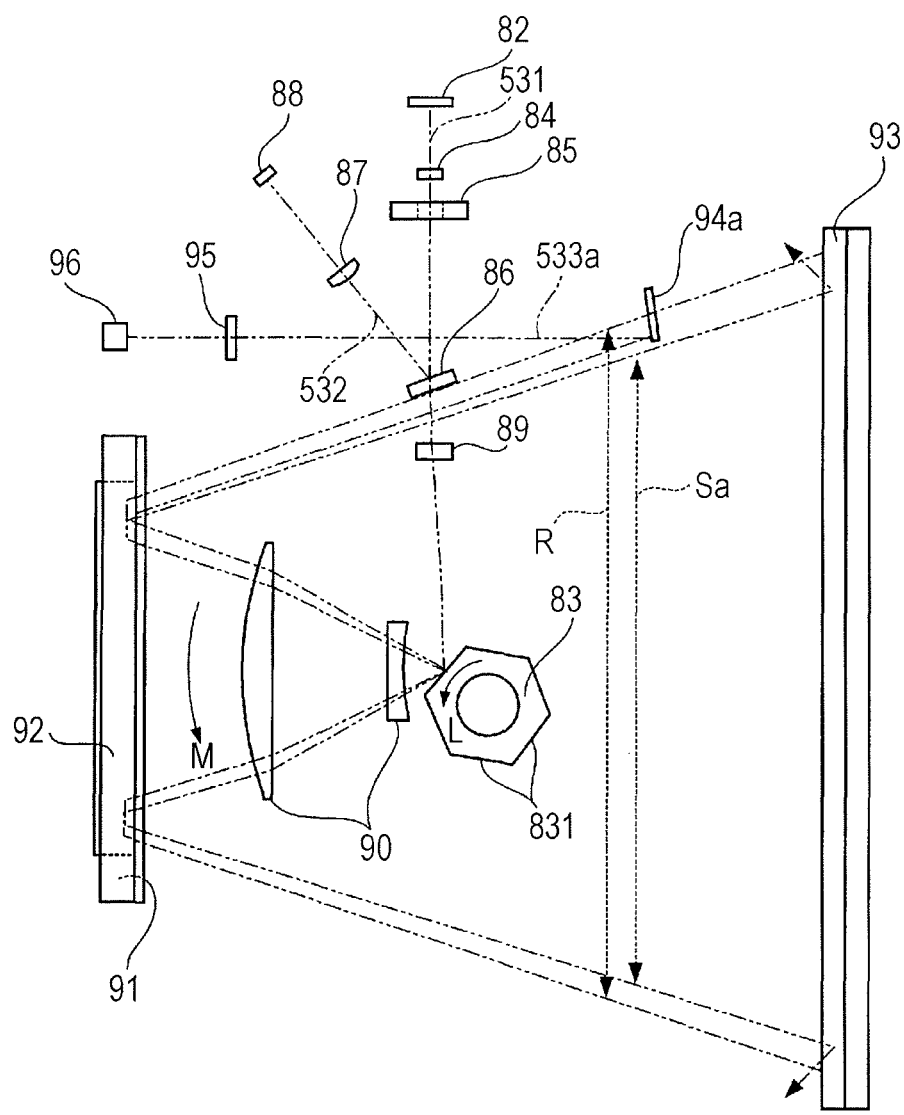
FIG. 3 is a plan view of an optical system provided in a housing of the exposure device.
Figure 4:
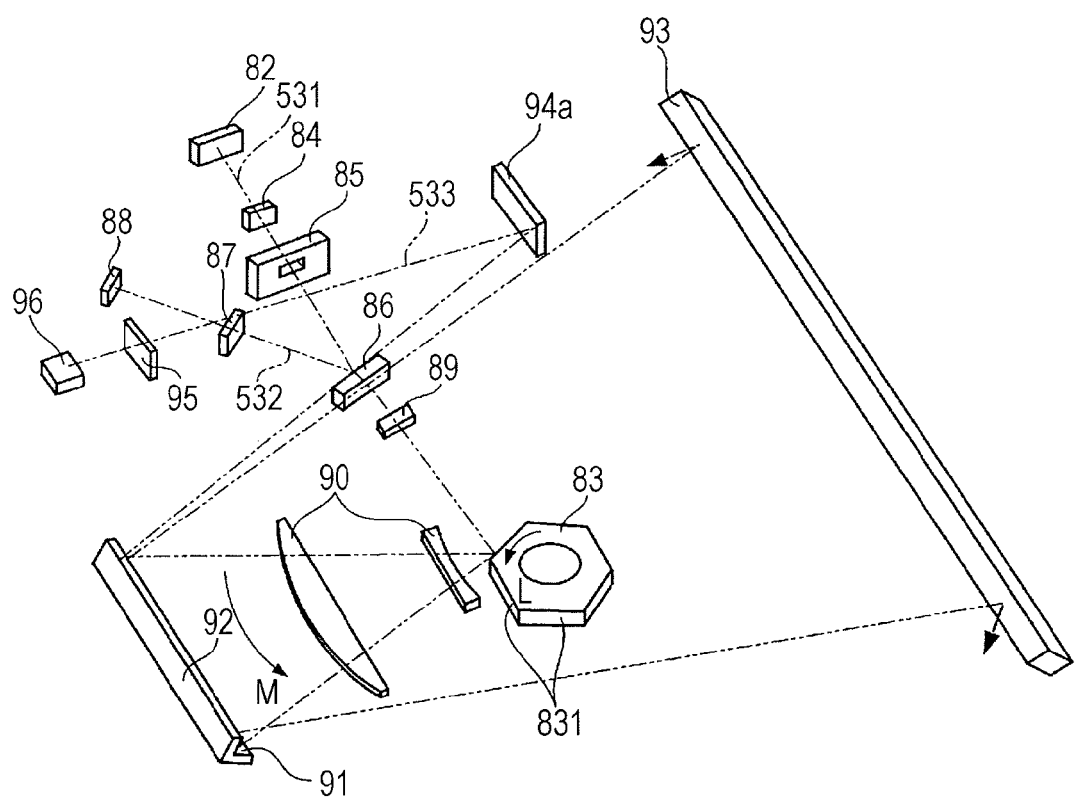
FIG. 4 is a perspective view of the optical system provided in the housing of the exposure device.

FIGS. 3 and 4 are a plan view and a perspective view, respectively, of the optical system housed in the housing 541 of the exposure device 53.

The plural light beams 531 emitted from the laser diode 82 travel through a collimating lens 84 and an aperture 85, and strike a half mirror 86. The half mirror 86 reflects part of the light beams 531 as a light beam 532. The light beam 532 travels through a focusing lens 87 and enters an optical sensor 88 for light quantity detection. A photodetection signal is generated by the optical sensor 88 and is transmitted to the circuit board 81 illustrated in FIG. 2. The quantity of light beams 531 to be emitted from the laser diode 82 is adjusted on the basis of the photodetection signal by the processing circuit 812 mounted on the circuit board 81.

Other part of the light beams 531 is transmitted through the half mirror 86, travels through a cylindrical lens 89, and strikes the rotatable polygon mirror 83. The rotatable polygon mirror 83 has peripheral surfaces 831 functioning as reflective mirrors and reflects incoming light in a direction corresponding to the angle of rotation thereof. The rotatable polygon mirror 83 rotates in the direction of arrow L. Hence, the light beams 531 reflected by the rotatable polygon mirror 83 are repeatedly deflected in the direction of arrow M.

The light beams 531 reflected by the rotatable polygon mirror 83 travel through fθ lens elements 90, are reflected upward by a cylindrical mirror 91, and are reflected by a plane mirror 92 in such a direction that the optical path is turned. The light beams 531 reflected by the plane mirror 92 travel above the fθ lens elements 90 and the rotatable polygon mirror 83, are reflected downward by a cylindrical mirror 93, travel through an opening 542 (see FIG. 2) provided in the housing 541, and are emitted downward from the housing 541. The light beams 531 emitted from the housing 541 of the exposure device 53 are used for scanning of the photoconductor 51 along the rotational axis of the photoconductor 51, as illustrated in FIG. 1. Thus, an electrostatic latent image is formed on the photoconductor 51.

Referring to FIG. 3, a reflective mirror 94a is provided at a position inside a deflection area R within which the light beams 531 are deflected by the rotatable polygon mirror 83 and outside a scanning area Sa used for the scanning of the photoconductor 51. The light beams 531 reflected by the plane mirror 92 are reflected by the reflective mirror 94a as a light beam 533a at the start of each scan. The light beam 533a as the reflection from the reflective mirror 94a travels through a focusing lens 95 and enters an optical sensor 96 for timing detection.

The optical sensor 96 detects the start timing of each scan so as to adjust the timing of modulation of the light beams 531. A photodetection signal is generated by the optical sensor 96 and is transmitted to the processing/controlling circuit 21 (see FIG. 1). The processing/controlling circuit 21 generates an image signal whose timing is adjusted on the basis of the photodetection signal. The image signal from the processing/controlling circuit 21 is input to the circuit board 81 through the cable 811. Thus, the laser diode 82 emits the light beams 531 modulated in accordance with the modulation signal based on the image signal received through the cable 811 with the light quantity adjusted on the basis of the photodetection signal generated by the optical sensor 88.

The exposure device 53 illustrated in FIGS. 2 to 4 is applicable to different types of image forming apparatuses 1 whose scanning areas (corresponding to the scanning area Sa illustrated in FIG. 4) have different widths in the direction in which the rotational axis of the photoconductor 51 (see FIG. 1) extends (the direction perpendicular to the page surface of FIG. 1), although FIG. 1 does not illustrate the differences between such image forming apparatuses 1.

Figure 5:
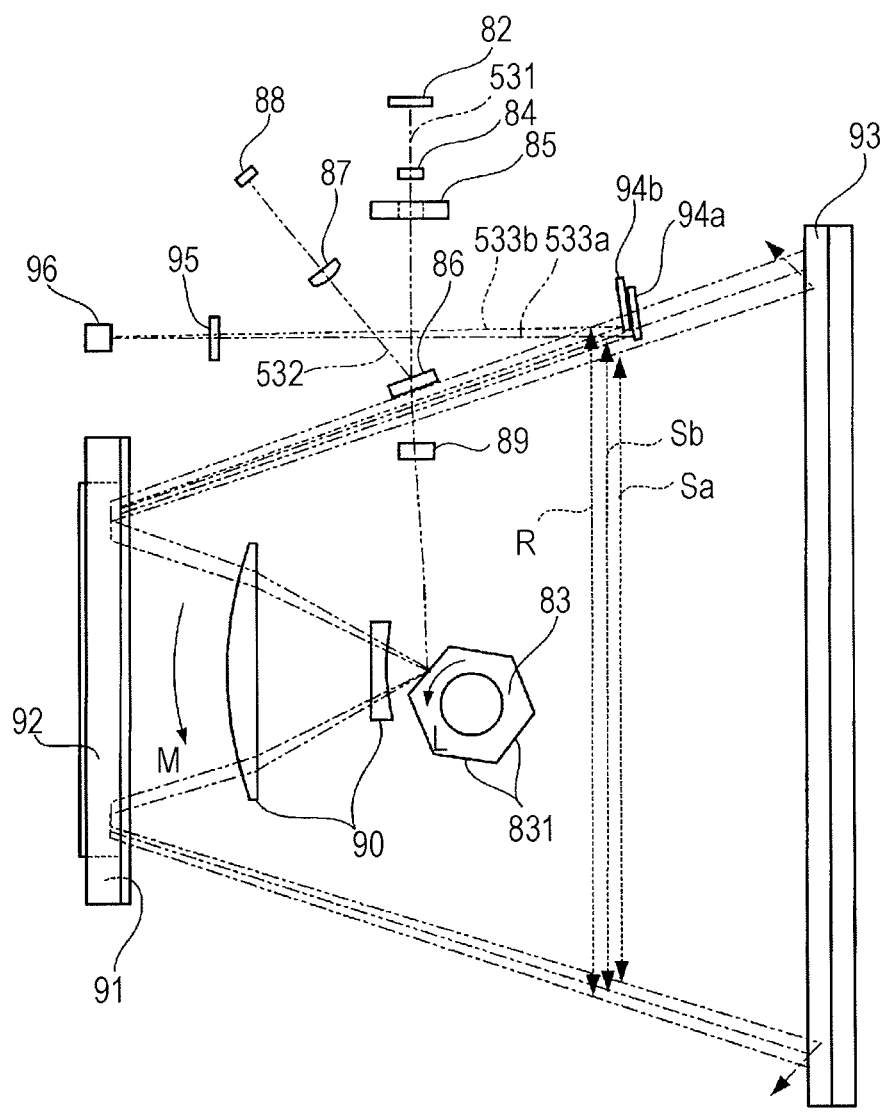
FIG. 5 illustrates narrow and wide scanning areas superposed on the plan view illustrated in FIG. 3.

FIG. 5 illustrates narrow and wide scanning areas Sa and Sb superposed on the plan view illustrated in FIG. 3.

If the laser diode 82 is kept on, scanning is performed such that the light beams 531 from the laser diode 82 are deflected within the deflection area R with the rotation of the rotatable polygon mirror 83.

In an image forming apparatus 1 of a first type, the scanning of the photoconductor 51 (see FIG. 1) is performed such that the light beams 531 are deflected over the scanning area Sa within the deflection area R, with the reflective mirror 94a being positioned immediately outside the scanning area Sa such that the light beam 533a from the reflective mirror 94a is received by the optical sensor 96. Thus, the scan start timing is detected.

In an image forming apparatus 1 of a second type, the scanning of the photoconductor 51 (see FIG. 1) is performed such that the light beams 531 are deflected over the scanning area Sb, which is a little wider than the scanning area Sa. In this case, since the reflective mirror 94a partially overlaps the scanning area Sb, the scanning of the photoconductor 51 using the entirety of the scanning area Sb cannot be performed. Hence, instead of the reflective mirror 94a, a reflective mirror 94b is provided at a position immediately outside the scanning area Sb and inside the deflection area R. The angle of the reflective mirror 94b is adjusted such that a light beam 533b as the reflection from the reflective mirror 94b enters the optical sensor 96.

Since the reflective mirror 94b is also positioned inside the deflection area R, the reflective mirror 94b may be used for the scanning of the photoconductor 51 in both cases of the scanning areas Sa and Sb. Considering the apparatus development schedule, however, if the apparatus employing the scanning area Sa is first launched into the market, followed by the apparatus employing the scanning area Sb, it is difficult to unify into the reflective mirror 94b.

Moreover, the reflective mirror 94b is positioned farther from the starting point of the scanning area Sa, which is on the side of the reflective mirror 94b, than the reflective mirror 94a is. Therefore, the accuracy in detecting the scan start timing may be correspondingly reduced.

Furthermore, in the case of the scanning area Sb, the optical path needs to be deflected by a larger amount than in the case of the scanning area Sa. Therefore, the peripheral surfaces 831, i.e., reflective mirrors, of the rotatable polygon mirror 83 need to be used up to portions closer to the edges thereof. As a matter of manufacturing process, it is difficult to obtain sufficient flatness in portions near the edges of the rotatable polygon mirror 83. Therefore, the scan start timing may vary with the peripheral surfaces 831.

For such reasons, the exposure device 53 described herein employs the reflective mirror 94a when included in the image forming apparatus 1 employing the scanning area Sa, and the reflective mirror 94b when included in the image forming apparatus 1 employing the scanning area Sb.

Now, a structure that supports the two reflective mirrors 94a and 94b and so forth will be described.

Figure 6:
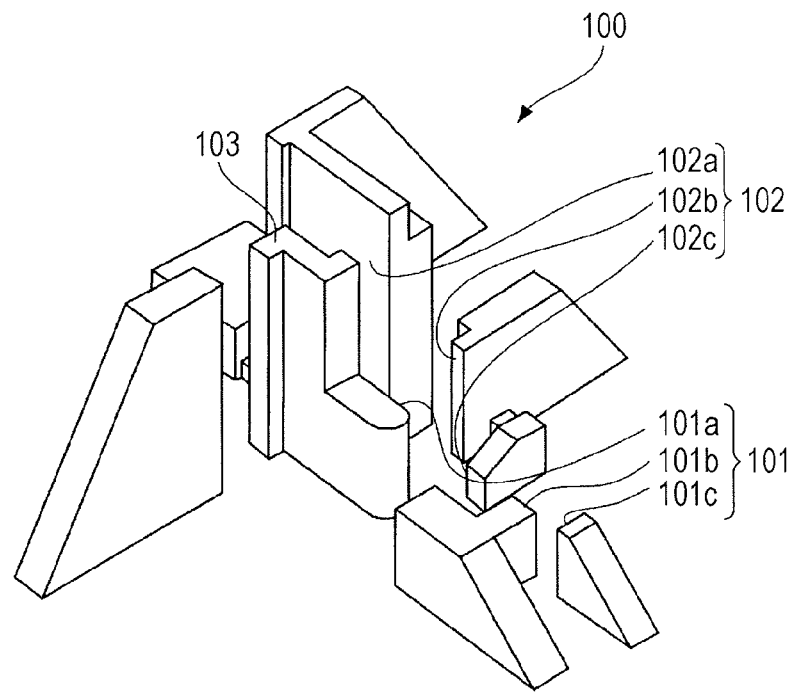
FIG. 6 is a perspective view of a supporting unit configured to support one of first and second reflective mirrors to be provided outside the respective scanning areas.
Figure 7:
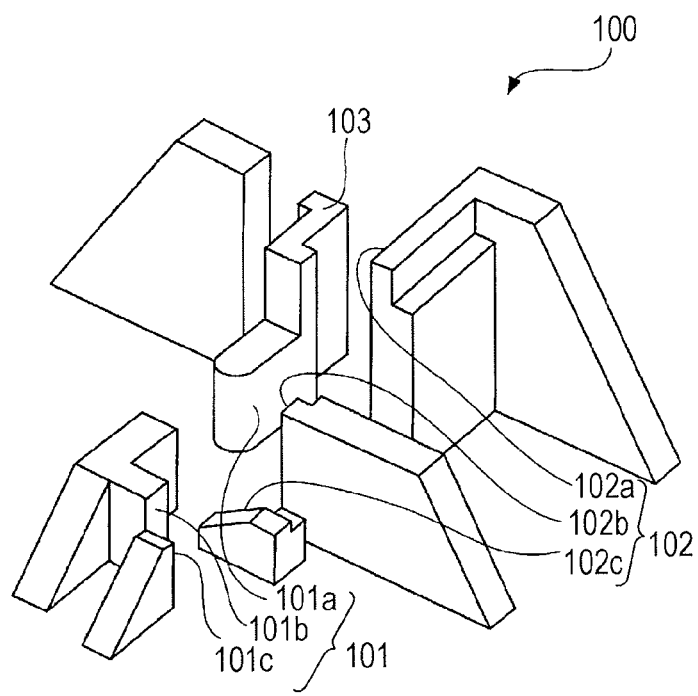
FIG. 7 is another perspective view of the supporting unit at a different angle from FIG. 6.

FIGS. 6 and 7 are perspective views, at respective angles, of a supporting unit 100 included in the housing 541 of the exposure device 53 (see FIG. 2), the supporting unit 100 being configured to support one of the reflective mirrors 94a and 94b to be provided outside the respective scanning areas Sa and Sb.

Figure 8:
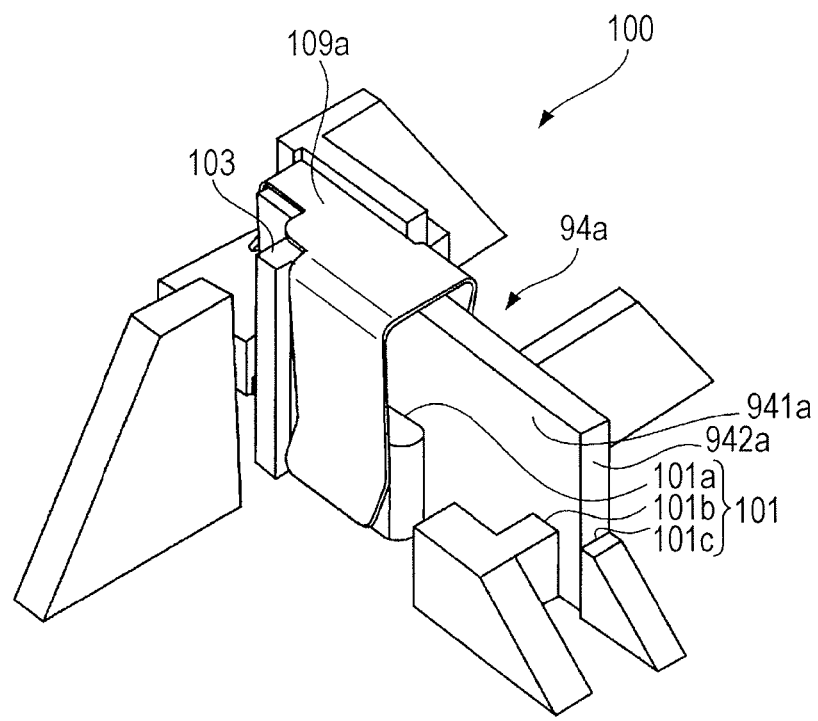
FIG. 8 is yet another perspective view of the supporting unit illustrated in FIGS. 6 and 7 supporting the first reflective mirror in a case where the narrow scanning area is employed.
Figure 9:
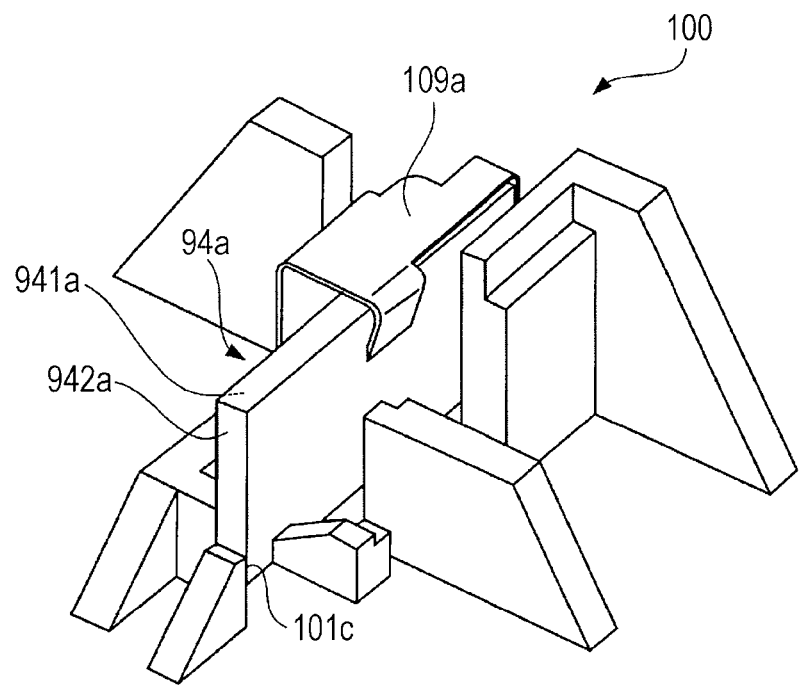
FIG. 9 is yet another perspective view of the supporting unit illustrated in FIGS. 6 and 7 supporting the first reflective mirror in the case where the narrow scanning area is employed and at a different angle from FIG. 8.

FIGS. 8 and 9 are other perspective views, at respective angles, of the supporting unit 100 illustrated in FIGS. 6 and 7 supporting the reflective mirror 94a in the case where the scanning area Sa, the narrower, is employed.

Figure 10:
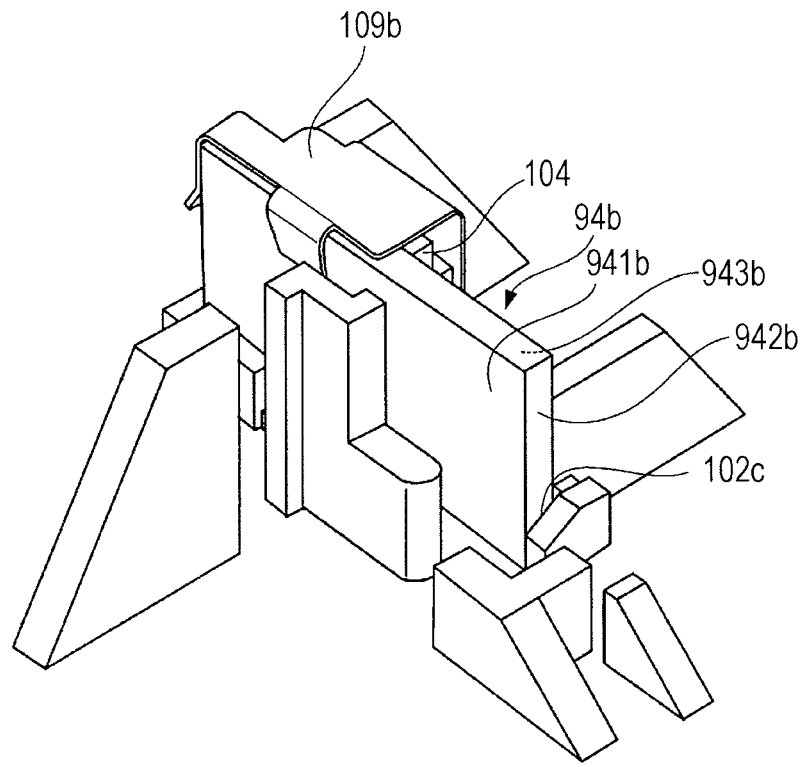
FIG. 10 is yet another perspective view of the supporting unit illustrated in FIGS. 6 and 7 supporting the second reflective mirror in a case where the wide scanning area is employed.
Figure 11:
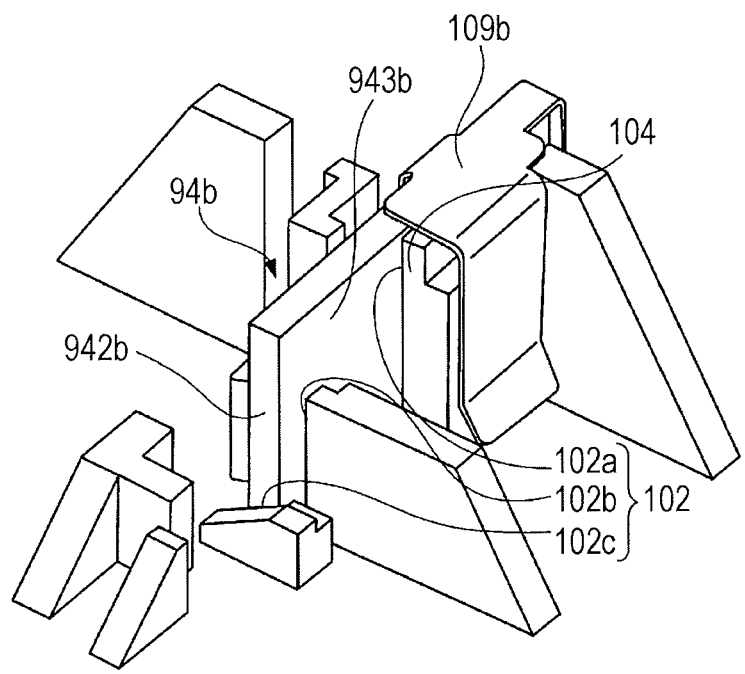
FIG. 11 is yet another perspective view of the supporting unit illustrated in FIGS. 6 and 7 supporting the second reflective mirror in the case where the wide scanning area is employed and at a different angle from FIG. 10.

FIGS. 10 and 11 are yet other perspective views, at respective angles, of the supporting unit 100 illustrated in FIGS. 6 and 7 supporting the reflective mirror 94b in the case where the scanning area Sb, the wider, is employed.

In the first exemplary embodiment, the two reflective mirrors 94a and 94b are of the same dimensions.

The supporting unit 100 includes a first support 101 configured to support the reflective mirror 94a and a second support 102 configured to support the reflective mirror 94b.

Referring to FIGS. 8 and 9, the first support 101 includes two contact walls 101a and 101b with which a reflective surface 941a of the reflective mirror 94a is brought into contact and a contact wall 101c with which a side surface 942a of the reflective mirror 94a is brought into contact. The reflective mirror 94a has the position and angle thereof determined by being brought into contact with the three contact walls 101a to 101c and is fastened to an upright wall 103 with a metal fastening member 109a, the upright wall 103 being provided on the housing 541 (see FIG. 2) and forming the contact wall 101a.

Referring to FIGS. 10 and 11, the second support 102 includes two contact walls 102a and 102b with which a back surface 943b of the reflective mirror 94b is brought into contact and a contact wall 102c with which a side surface 942b of the reflective mirror 94b is brought into contact. The reflective mirror 94b has the position and angle thereof determined by being brought into contact with the three contact walls 102a to 102c and is fastened to an upright wall 104 with a metal fastening member 109b, the upright wall 104 being provided on the housing 541 (see FIG. 2) and forming the contact wall 102a.

Figure 12:
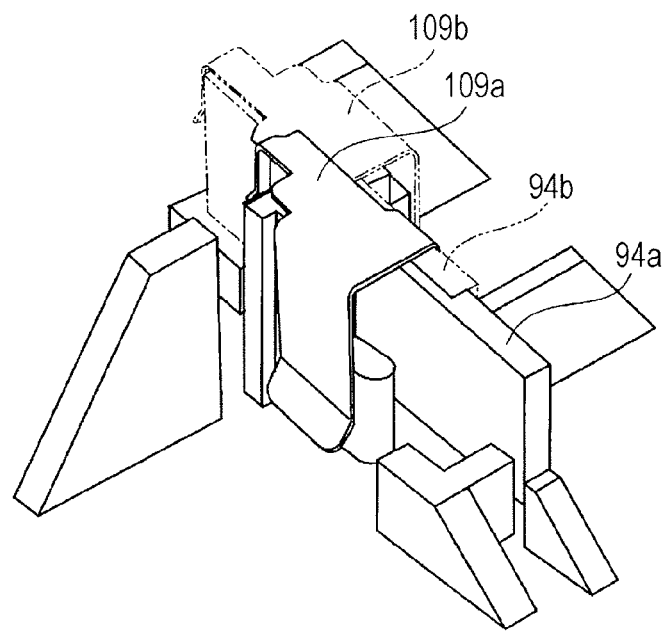
FIG. 12 is yet another perspective view of the supporting unit illustrated in FIGS. 6 and 7 with both of the reflective mirrors also illustrated.
Figure 13:
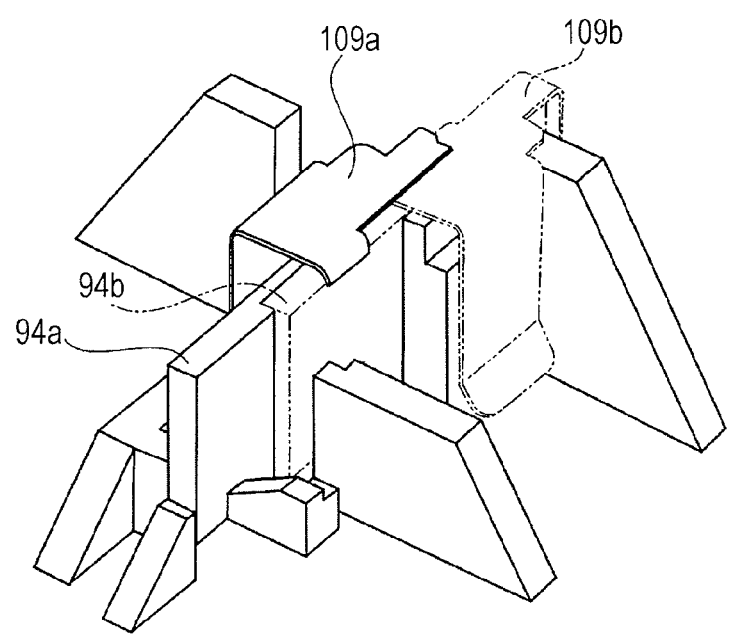
FIG. 13 is yet another perspective view of the supporting unit illustrated in FIGS. 6 and 7 with both of the reflective mirrors also illustrated and at a different angle from FIG. 12.

FIGS. 12 and 13 are yet other perspective views, at respective angles, of the supporting unit 100 illustrated in FIGS. 6 and 7 with both of the two reflective mirrors 94a and 94b also illustrated.

The reflective mirror 94a and the fastening member 109a are illustrated by solid lines, and the reflective mirror 94b and the fastening member 109b are illustrated by two-dot chain lines.

The two reflective mirrors 94a and 94b are to be supported by the first support 101 (see FIGS. 6 to 8) and the second support 102 (see FIGS. 6, 7, and 11), respectively. As illustrated in FIGS. 12 and 13, the two reflective mirrors 94a and 94b overlap each other. Therefore, only one of the two reflective mirrors 94a and 94b can be provided.

In the first exemplary embodiment, to provide the two reflective mirrors 94a and 94b at respective positions that are close to each other as illustrated in FIGS. 12 and 13, the reflective mirror 94a is positioned by bringing the reflective surface 941a into contact with the first support 101, and the reflective mirror 94b is positioned by bringing the back surface 943b into contact with the second support 102.

By providing the two reflective mirrors 94a and 94b at such close positions as to overlap each other, the optical characteristics of the two reflective mirrors 94a and 94b detected by the optical sensor 96 (see FIGS. 2 to 4) become substantially the same.

Although the bottom surfaces (the surfaces in contact with the inner surface of the housing 541) of the reflective mirrors 94a and 94b are not mentioned herein, the reflective mirrors 94a and 94b may be provided with the bottom surfaces thereof being in direct contact with the inner surface of the housing 541. Alternatively, the reflective mirrors 94a and 94b may be individually provided on two projections provided on the inner surface of the housing 541 with the bottom surfaces thereof being in contact with the projections, as in a case described separately below with reference to FIG. 15.

Figure 14:
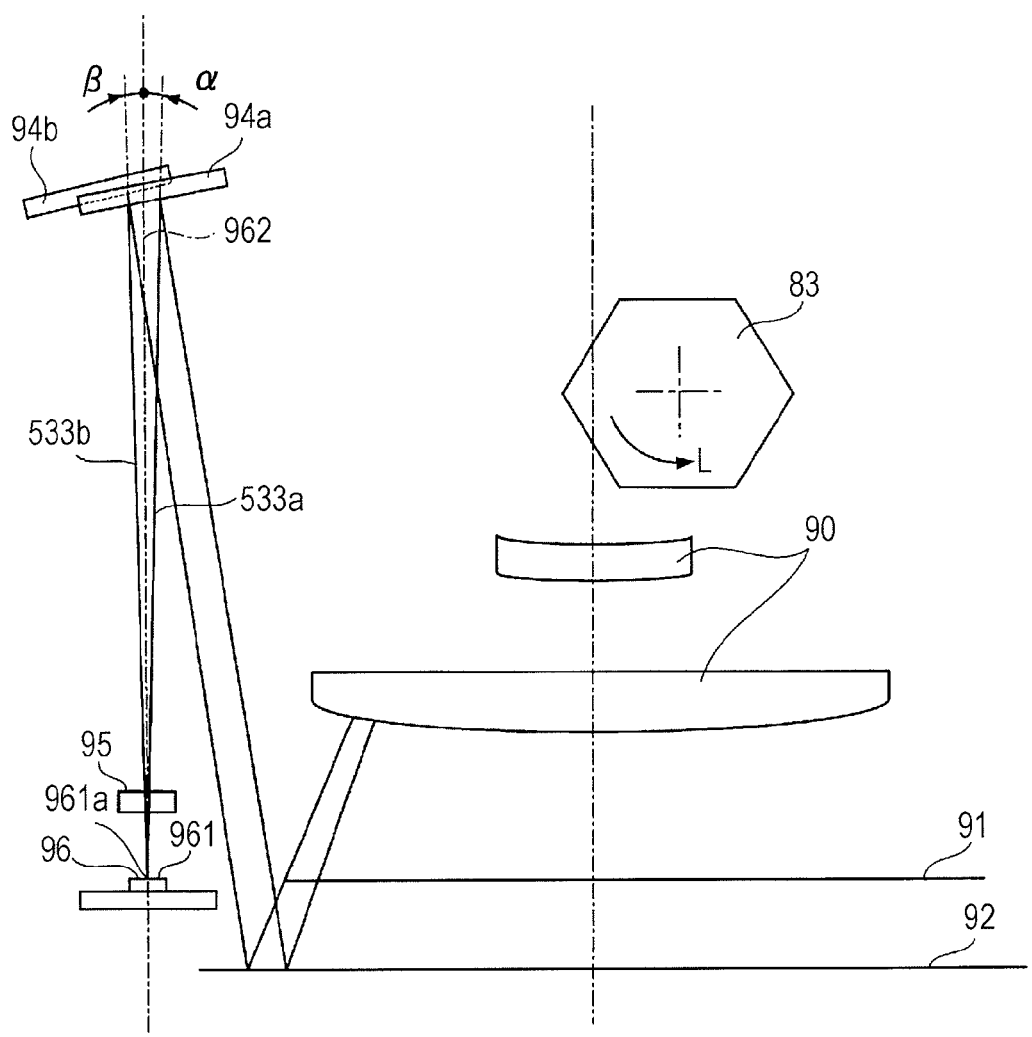
FIG. 14 illustrates the positional relationship between an optical sensor and the reflective mirrors.

FIG. 14 illustrates the positional relationship between the optical sensor 96 and the two reflective mirrors 94a and 94b.

The two reflective mirrors 94a and 94b illustrated in FIG. 14 are assumed to be supported by the first support 101 and the second support 102, respectively. FIG. 14 also illustrates a perpendicular 962 standing at a center 961a of a receiving surface 961 of the optical sensor 96.

With the rotation of the rotatable polygon mirror 83, the light beams 533a and 533b reflected by the respective reflective mirrors 94a and 94b toward the optical sensor 96 individually move across the receiving surface 961 of the optical sensor 96. During such crossing movements of the light beams 533a and 533b, the light beams 533a and 533b individually pass the center 961a of the receiving surface 961. The quantity of light received by the optical sensor 96 becomes the largest when the center axes of the light beams 533a and 533b individually coincide with the center 961a of the receiving surface 961. Herein, the angles formed between the perpendicular 962 standing on the receiving surface 961 and the center axes of the light beams 533a and 533b when the center axes coincide with the center 961a of the receiving surface 961 are denoted by α and β, respectively. At such a timing, the two light beams 533a and 533b are incident on the receiving surface 961 from opposite sides of the perpendicular 962, establishing a relationship of α=β.

Furthermore, since the two reflective mirrors 94a and 94b are positioned so close to each other as to overlap each other, the optical lengths of the light beams 533a and 533b emitted from the laser diode 82 (see FIGS. 2 to 4), reflected by the respective reflective mirrors 94a and 94b, and reaching the optical sensor 96 are substantially the same.

That is, the light beam 533a obtained when the reflective mirror 94a is employed and the light beam 533b obtained when the reflective mirror 94b is employed are individually incident on the optical sensor 96 from opposite sides of the perpendicular 962 but under the same conditions for the optical sensor 96. Therefore, the quantities of light received by the optical sensor 96 in the case where the reflective mirror 94a is employed and in the case where the reflective mirror 94b is employed are substantially the same. Furthermore, the ways the light beams 533a and 533b behave during scan are substantially the same. Accordingly, the photodetection signals generated by the optical sensor 96 in the respective cases are substantially the same. Consequently, the levels of detection accuracy obtained in the case where the reflective mirror 94a is employed and in the case where the reflective mirror 94b is employed are substantially the same.

Figure 15:
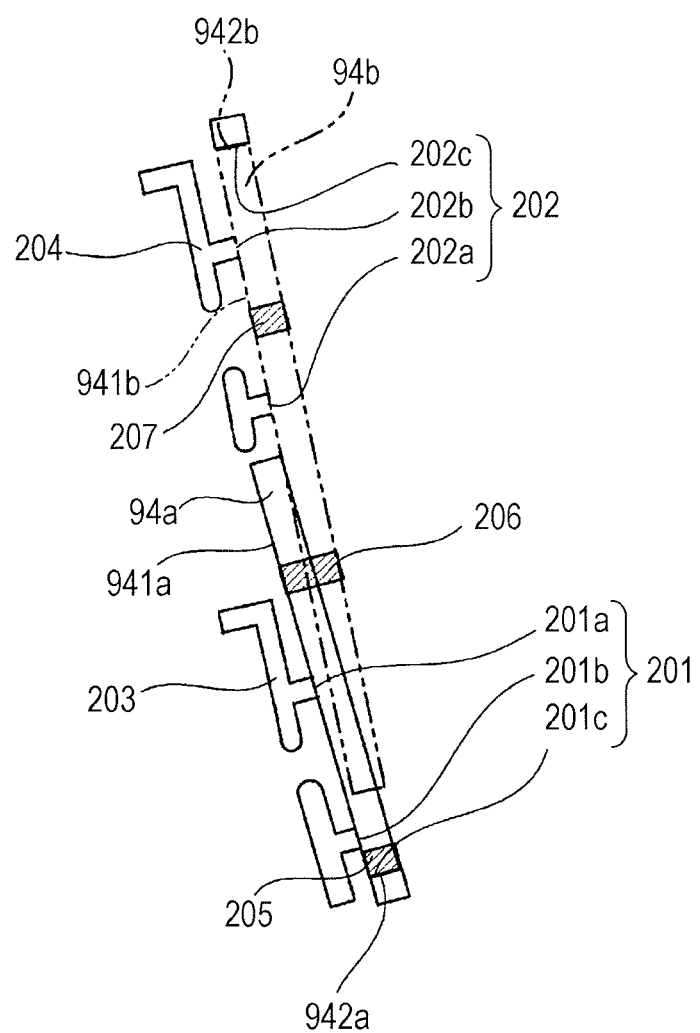
FIG. 15 illustrates an arrangement of the reflective mirrors according to a second exemplary embodiment of the invention.

FIG. 15 illustrates an arrangement of the two reflective mirrors 94a and 94b according to a second exemplary embodiment of the invention.

In the second exemplary embodiment, the two reflective mirrors 94a and 94b are of different dimensions, and either of the two is employed in accordance with the scanning area Sa or Sb (see FIG. 5). For the convenience of description, both of the two reflective mirrors 94a and 94b are illustrated in FIG. 15.

The second exemplary embodiment employs a first support 201 and a second support 202. The first support 201 includes two contact surfaces 201a and 201b with which the reflective surface 941a of the reflective mirror 94a is brought into contact and a contact surface 201c with which the side surface 942a of the reflective mirror 94a is brought into contact. The second support 202 includes two contact surfaces 202a and 202b with which a reflective surface 941b of the reflective mirror 94b is brought into contact and a contact surface 202c with which the side surface 942b of the reflective mirror 94b is brought into contact.

Two upright walls 203 and 204 have the same shape. The reflective mirrors 94a and 94b are fastened to the upright walls 203 and 204, respectively, with, for example, metal fastening members equivalent to the fastening members 109a and 109b illustrated in FIGS. 8 to 13. By providing the two upright walls 203 and 204 in the same shape, a fastening member common to both of the reflective mirrors 94a and 94b is employed.

FIG. 15 also illustrates three projections 205 to 207 projecting from the inner surface of the housing 541. The reflective mirror 94a is positioned such that the bottom surface thereof is in contact with two of the three projections 205 to 207, specifically, the projections 205 and 206. The reflective mirror 94b is positioned such that the bottom surface thereof is in contact with the projections 206 and 207. Thus, the levels of the reflective mirrors 94a and 94b are determined even if the inner surface of the housing 541 has some curves and irregularities.

In the second exemplary embodiment illustrated in FIG. 15, the two reflective mirrors 94a and 94b have different dimensions and therefore cannot be used regardless of whether the image forming apparatus 1 employs the scanning area Sa or Sb (see FIG. 5). In both cases of the reflective mirrors 94a and 94b illustrated in FIG. 15, however, the reflective mirrors 94a and 94b are positioned by bringing the reflective surfaces 941a and 941b into contact with the first and second supports 201 and 202, respectively. In the first exemplary embodiment, the reflective mirror 94a is positioned by bringing the reflective surface 941a into contact with the first support 101, whereas the reflective mirror 94b is positioned by bringing the back surface 943b into contact with the second support 102. In such a case, if there is any error in the thickness of the reflective mirrors 94a and 94b, the position of the reflective surface 941b when the reflective mirror 94b is employed may include an error corresponding to the error in the thickness. Such an error may lead to an error in the optical length and so forth.

In contrast, in the second exemplary embodiment illustrated in FIG. 15, both of the two reflective mirrors 94a and 94b are positioned by bringing the reflective surfaces 941a and 941b into contact with the first and second supports 201 and 202, respectively. Therefore, the error in the thickness of the reflective mirrors 94a and 94b does not affect the optical length. Accordingly, a more accurate optical system is provided.

While the exemplary embodiments described above concern the exposure device 53 included in the image forming apparatus 1 configured as illustrated in FIG. 1, the invention is also applicable to exposure devices included in other types of image forming apparatuses, for example, an image forming apparatus including plural photoconductors.

Furthermore, the optical scanning device according to the invention is not limited to an optical scanning device employed as an exposure device of an image forming apparatus, and is applicable to optical scanning devices employed in various fields in which the scanning area needs to be changed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An optical scanning device comprising:
   a housing;
   a light source that emits a light beam;
   a rotatable polygon mirror that receives the light beam from the light source while rotating and deflects the light beam by reflecting the light beam in a direction corresponding to an angle of rotation thereof;
   a scanning optical system that guides the light beam from the rotatable polygon mirror to a scanning object in such a manner as to repeatedly scan the scanning object with the light beam;

first and second reflective mirrors one of which is provided inside a deflection area within which the light beam is deflected by the rotatable polygon mirror; and a photodetector that receives the light beam reflected by the one of the first and second reflective mirrors and detects the timing of scanning of the scanning object with the light beam, wherein the scanning object is one of first and second scanning objects, and wherein the housing includes a first support configured to support the first reflective mirror at a first position that is outside a first scan-use area and inside a second scan-use area, the first scan-use area being used for the scanning of the first scanning object and being narrower than the second scan-use area that is used for the scanning of the second scanning object, the first reflective mirror being supported in such a manner as to reflect the light beam toward the photodetector; and a second support configured to support the second reflective mirror at a second position that is outside the second scan-use area, the second reflective mirror being supported in such a manner as to reflect the light beam toward the photodetector, wherein the first and second supports are provided at such respective positions that the first reflective mirror to be supported by the first support and the second reflective mirror to be supported by the second support overlap each other, and only one of the first and second reflective mirrors is supportable by a corresponding one of the first and second supports.

2. The optical scanning device according to claim 1, wherein the first support has a first contact portion to be in contact with a first surface of the first reflective mirror and is configured to support the first reflective mirror such that the first surface of the first reflective mirror is in contact with the first contact portion, wherein the second support has a second contact portion to be in contact with a second surface of the second reflective mirror and is configured to support the second reflective mirror such that the second surface of the second reflective mirror is in contact with the second contact portion, and wherein if the first surface is a reflective surface, the second surface is a back surface;

and if the first surface is a back surface, the second surface is a reflective surface.

3. The optical scanning device according to claim 1, wherein the first support has a first contact portion to be in contact with a reflective surface of the first reflective mirror and is configured to support the first reflective mirror such that the reflective surface of the first reflective mirror is in contact with the first contact portion, and wherein the second support has a second contact portion to be in contact with a reflective surface of the second reflective mirror and is configured to support the second reflective mirror such that the reflective surface of the second reflective mirror is in contact with the second contact portion.

4. The optical scanning device according to claim 1, wherein the first and second supports support the first and second reflective mirrors, respectively, such that the light beam that is reflected by the first reflective mirror supported by the first support and is incident on the center of a photo-detection surface of the photodetector and the light beam that is reflected by the second reflective mirror supported by the second support and is incident on the center of the photodetection surface are individually incident from opposite sides of a perpendicular standing at the center of the photodetection surface.

5. An optical scanning device comprising:

a housing;

a light source that emits a light beam;

a rotatable polygon mirror that receives the light beam from the light source while rotating and deflects the light beam by reflecting the light beam in a direction corresponding to an angle of rotation thereof;

a scanning optical system that guides the light beam from the rotatable polygon mirror to a scanning object in such a manner as to repeatedly scan the scanning object with the light beam;

first and second reflective mirrors one of which is provided inside a deflection area within which the light beam is deflected by the rotatable polygon mirror; and a photodetector that receives the light beam reflected by the one of the first and second reflective mirrors and detects the timing of scanning of the scanning object with the light beam, wherein the scanning object is one of first and second scanning objects, and wherein the housing includes a first support configured to support the first reflective mirror at a first position that is outside a first scan-use area and inside a second scan-use area, the first scan-use area being used for the scanning of the first scanning object and being narrower than the second scan-use area that is used for the scanning of the second scanning object, the first reflective mirror being supported in such a manner as to reflect the light beam toward the photodetector; and a second support configured to support the second reflective mirror at a second position that is outside the second scan-use area, the second reflective mirror being supported in such a manner as to reflect the light beam toward the photodetector, wherein the first support has a first contact portion to be in contact with a first surface of the first reflective mirror and is configured to support the first reflective mirror such that the first surface of the first reflective mirror is in contact with the first contact portion, wherein the second support has a second contact portion to be in contact with a second surface of the second reflective mirror and is configured to support the second reflective mirror such that the second surface of the second reflective mirror is in contact with the second contact portion, and wherein if the first surface is a reflective surface, the second surface is a back surface;

and if the first surface is a back surface, the second surface is a reflective surface.

6. The optical scanning device according to claim 5, wherein the first and second reflective mirrors are of the same dimensions.

7. An optical scanning device comprising:

a housing;

a light source that emits a light beam;

a rotatable polygon mirror that receives the light beam from the light source while rotating and deflects the light beam by reflecting the light beam a direction corresponding to an angle of rotation thereof;

a scanning optical system that guides the light beam from the rotatable polygon mirror to a scanning object in such a manner as to repeatedly scan the scanning object with the light beam;

first and second reflective mirrors one of which is provided inside a deflection area within which the light beam is deflected by the rotatable polygon mirror; and a photodetector that receives the light beam reflected by the one of the first and second reflective mirrors and detects the timing of scanning of the scanning object with the light beam, wherein the scanning object is one of first and second scanning objects, and wherein the housing includes a first support configured to support the first reflective mirror at a first position that is outside a first scan-use area and inside a second scan-use area, the first scan-use area being used for the scanning of the first scanning object and being narrower than the second scan-use area that is used for the scanning of the second scanning object, the first reflective mirror being supported in such a manner as to reflect the light beam toward the photodetector; and a second support configured to support the second reflective mirror at a second position that is outside the second scan-use area, the second reflective mirror being supported in such a manner as to reflect the light beam toward the photodetector, wherein the first support has a first contact portion to be in contact with a reflective surface of the first reflective mirror and is configured to support the first reflective mirror such that the reflective surface of the first reflective mirror is in contact with the first contact portion, and wherein the second support has a second contact portion to be in contact with a reflective surface of the second reflective mirror and is configured to support the second reflective mirror such that the reflective surface of the second reflective mirror is in contact with the second contact portion.

8. The optical scanning device according to claim 7, wherein the first and second reflective mirrors are of different dimensions.

9. An optical scanning device comprising:

a housing;

a light source that emits a light beam;

a rotatable polygon mirror that receives the light beam from the light source while rotating and deflects the light beam by reflecting the light beam direction corresponding to an angle of rotation thereof;

a scanning optical system that guides the light beam from the rotatable polygon mirror to a scanning object in such a manner as to repeatedly scan the scanning object with the light beam;

first and second reflective mirrors one of which is provided inside a deflection area within which the light beam is deflected by the rotatable polygon mirror; and a photodetector that receives the light beam reflected by the one of the first and second reflective mirrors and detects the timing of scanning of the scanning object with the light beam, wherein the scanning object is one of first and second scanning objects, and wherein the housing includes a first support configured to support the first reflective mirror at a first position that is outside a first scan-use area and inside a second scan-use area, the first scan-use area being used for the scanning of the first scanning object and being narrower than the second scan-use area that is used for the scanning of the second scanning object, the first reflective mirror being supported in such a manner as to reflect the light beam toward the photodetector; and a second support configured to support the second reflective mirror at a second position that is outside the second scan-use area, the second reflective mirror being supported in such a manner as to reflect the light beam toward the photodetector, wherein the first and second supports support the first and second reflective mirrors, respectively, such that the light beam that is reflected by the first reflective mirror supported by the first support and is incident on the center of a photodetection surface of the photodetector and the light beam that is reflected by the second reflective mirror supported by the second support and is incident on the center of the photodetection surface are individually incident from opposite sides of a perpendicular standing at the center of the photodetection surface.

10. An image forming apparatus comprising:

a developed-image-forming section including an image bearing member on which an electrostatic latent image is formed through charging and exposure, a charging device that charges the image bearing member, an exposure device that performs exposure on the image bearing member by scanning the image bearing member with a light beam modulated in accordance with an image signal, and a developing device that forms a developed image by developing the electrostatic latent image; and a transfer-fixing section including a transfer device that transfers the developed image formed by the developed-image-forming section to a recording medium, and a fixing device that fixes the developed image transferred to the recording medium, wherein the exposure device includes a housing;

a light source that receives the image signal and emits the light beam modulated in accordance with the image signal;

a rotatable polygon mirror that receives the light beam from the light source while rotating and reflects the light beam in a direction corresponding to an angle of rotation thereof;

a scanning optical system that guides the light beam from the rotatable polygon mirror to the image bearing member in such a manner as to repeatedly scan the image bearing member with the light beam;

first and second reflective mirrors one of which is provided inside a deflection area within which the light beam is deflected by the rotatable polygon mirror; and a photodetector that receives the light beam reflected by the one of the first and second reflective mirrors and detects the timing of scanning of the image bearing member with the light beam, wherein the image bearing member is one of first and second image bearing members, and wherein the housing includes a first support configured to support the first reflective mirror at a first position that is outside a first scan-use area and inside a second scan-use area, the first scan-use area being used for the scanning of the first image bearing member when the first image bearing member is employed, the first scan-use area being narrower than the second scan-use area that is used for the scanning of the second image bearing member when the second image bearing member is employed, the first reflective mirror being supported in such a manner as to reflect the light beam toward the photodetector; and a second support configured to support the second reflective mirror at a second position that is outside the second scan-use area, the second reflective mirror being supported in such a manner as to reflect the light beam toward the photodetector, wherein the first and second supports are provided at such respective positions that the first reflective mirror to be supported by the first support and the second reflective mirror to be supported by the second support overlap each other, and only one of the first and second reflective mirrors is supportable by a corresponding one of the first and second supports.

11. The image forming apparatus according to claim 10, wherein the first support has a first contact portion to be in contact with a first surface of the first reflective mirror and is configured to support the first reflective mirror such that the first surface of the first reflective mirror is in contact with the first contact portion, wherein the second support has a second contact portion to be in contact with a second surface of the second reflective mirror and is configured to support the second reflective mirror such that the second surface of the second reflective mirror is in contact with the second contact portion, and wherein if the first surface is a reflective surface, the second surface is a back surface;

and if the first surface is a back surface, the second surface is a reflective surface.

12. The image forming apparatus according to claim 10, wherein the first support has a first contact portion to be in contact with a reflective surface of the first reflective mirror and is configured to support the first reflective mirror such that the reflective surface of the first reflective mirror is in contact with the first contact portion, and wherein the second support has a second contact portion to be in contact with a reflective surface of the second reflective mirror and is configured to support the second reflective mirror such that the reflective surface of the second reflective mirror is in contact with the second contact portion.

13. An image forming apparatus comprising:

a developed-image-forming section including an image bearing member on which an electrostatic latent image is formed through charging and exposure, a charging device that charges the image bearing member, an exposure device that performs exposure on the image bearing member by scanning the image bearing member with a light beam modulated in accordance with an image signal, and a developing device that forms a developed image by developing the electrostatic latent image; and a transfer-fixing section including a transfer device that transfers the developed image formed by the developed-image-forming section to a recording medium, and a fixing device that fixes the developed image transferred to the recording medium, wherein the exposure device includes a housing;

a light source that receives the image signal and emits the light beam modulated in accordance with the image signal;

a rotatable polygon mirror that receives the light beam from the light source while rotating and reflects the light beam in a direction corresponding to an angle of rotation thereof;

a scanning optical system that guides the light beam from the rotatable polygon mirror to the image bearing member in such a manner as to repeatedly scan the image bearing member with the light beam;

first and second reflective mirrors one of which is provided inside a deflection area within which the light beam is deflected by the rotatable polygon mirror; and a photodetector that receives the light beam reflected by the one of the first and second reflective mirrors and detects the timing of scanning of the image bearing member with the light beam, wherein the image bearing member is one of first and second image bearing members, and wherein the housing includes a first support configured to support the first reflective mirror at a first position that is outside a first scan-use area and inside a second scan-use area, the first scan-use area being used for the scanning of the first image bearing member when the first image bearing member is employed, the first scan-use area being narrower than the second scan-use area that is used for the scanning of the second image bearing member when the second image bearing member is employed, the first reflective mirror being supported in such a manner as to reflect the light beam toward the photodetector; and a second support configured to support the second reflective mirror at a second position that is outside the second scan-use area, the second reflective mirror being supported in such a manner as to reflect the light beam toward the photodetector, wherein the first and second supports support the first and second reflective mirrors, respectively, such that the light beam that is reflected by the first reflective mirror supported by the first support and is incident on the center of a photodetection surface of the photodetector and the light beam that is reflected by the second reflective mirror supported by the second support and is incident on the center of the photodetection surface are individually incident from opposite sides of a perpendicular standing at the center of the photodetection surface.

14. The image forming apparatus according to claim 10, wherein the first and second supports support the first and second reflective mirrors, respectively, such that the light beam that is reflected by the first reflective mirror supported by the first support and is incident on the center of a photodetection surface of the photodetector and the light beam that is reflected by the second reflective mirror supported by the second support and is incident on the center of the photodetection surface are individually incident from opposite sides of a perpendicular standing at the center of the photodetection surface.

15. An image forming apparatus comprising:

a developed-image-forming section including an image bearing member on which an electrostatic latent image is formed through charging and exposure, a charging device that charges the image bearing member, an exposure device that performs exposure on the image bearing member by scanning the image bearing member with a light beam modulated in accordance with an image signal, and a developing device that forms a developed image by developing the electrostatic latent image; and a transfer-fixing section including a transfer device that transfers the developed image formed by the developed-image-forming section to a recording medium, and a fixing device that fixes the developed image transferred to the recording medium, wherein the exposure device includes a housing;

a light source that receives the image signal and emits the light beam modulated in accordance with the image signal;

a rotatable polygon mirror that receives the light beam from the light source while rotating and reflects the light beam in a direction corresponding to an angle of rotation thereof;

a scanning optical system that guides the light beam from the rotatable polygon mirror to the image bearing member in such a manner as to repeatedly scan the image bearing member with the light beam;

first and second reflective mirrors one of which is provided inside a deflection area within which the light beam is deflected by the rotatable polygon mirror; and a photodetector that receives the light beam reflected by the one of the first and second reflective mirrors and detects the timing of scanning of the image bearing member with the light beam, wherein the image bearing member is one of first and second image bearing members, and wherein the housing includes a first support configured to support the first reflective mirror at a first position that is outside a first scan-use area and inside a second scan-use area, the first scan-use area being used for the scanning of the first image bearing member when the first image bearing member is employed, the first scan-use area being narrower than the second scan-use area that is used for the scanning of the second image bearing member when the second image bearing member is employed, the first reflective mirror being supported in such a manner as to reflect the light beam toward the photodetector; and a second support configured to support the second reflective mirror at a second position that is outside the second scan-use area, the second reflective mirror being supported in such a manner as to reflect the light beam toward the photodetector, wherein the first support has a first contact portion to be in contact with a first surface of the first reflective mirror and is configured to support the first reflective mirror such that the first surface of the first reflective mirror is in contact with the first contact portion, wherein the second support has a second contact portion to be in contact with a second surface of the second reflective mirror and is configured to support the second reflective mirror such that the second surface of the second reflective mirror is in contact with the second contact portion, and wherein if the first surface is a reflective surface, the second surface is a back surface;

and if the first surface is a back surface, the second surface is a reflective surface.

16. The image forming apparatus according to claim 15, wherein the first and second reflective mirrors are of the same dimensions.

17. An image forming apparatus comprising:

a developed-image-forming section including an image bearing member on which an electrostatic latent image is formed through charging and exposure, a charging device that charges the image bearing member, an exposure device that performs exposure on the image bearing member by scanning the image bearing member with a light beam modulated in accordance with an image signal, and a developing device that forms a developed image by developing the electrostatic latent image; and a transfer-fixing section including a transfer device that transfers the developed image formed by the developed-image-forming section to a recording medium, and a fixing device that fixes the developed image transferred to the recording medium, wherein the exposure device includes a housing;

a light source that receives the image signal and emits the light beam modulated in accordance with the image signal;

a rotatable polygon mirror that receives the light beam from the light source while rotating and reflects the light beam in a direction corresponding to an angle of rotation thereof;

a scanning optical system that guides the light beam from the rotatable polygon mirror to the image bearing member in such a manner as to repeatedly scan the image bearing member with the light beam;

first and second reflective mirrors one of which is provided inside a deflection area within which the light beam is deflected by the rotatable polygon mirror; and a photodetector that receives the light beam reflected by the one of the first and second reflective mirrors and detects the timing of scanning of the image bearing member with the light beam, wherein the image bearing member is one of first and second image bearing members, and wherein the housing includes a first support configured to support the first reflective mirror at a first position that is outside a first scan-use area and inside a second scan-use area, the first scan-use area being used for the scanning of the first image bearing member when the first image bearing member is employed, the first scan-use area being narrower than the second scan-use area that is used for the scanning of the second image bearing member when the second image bearing member is employed, the first reflective mirror being supported in such a manner as to reflect the light beam toward the photodetector; and a second support configured to support the second reflective mirror at a second position that is outside the second scan-use area, the second reflective mirror being supported in such a manner as to reflect the light beam toward the photodetector, wherein the first support has a first contact portion to be in contact with a reflective surface of the first reflective mirror and is configured to support the first reflective mirror such that the reflective surface of the first reflective mirror is in contact with the first contact portion, and wherein the second support has a second contact portion to be in contact with a reflective surface of the second reflective mirror and is configured to support the second reflective mirror such that the reflective surface of the second reflective mirror is in contact with the second contact portion.

18. The image forming apparatus according to claim 17, wherein the first and second reflective mirrors are of different dimensions.

\* \* \* \* \*